July 29, 1952 K. R. WENDT 2,605,350
SYNCHRONIZING SIGNAL SEPARATOR CIRCUIT
Filed Oct. 23, 1948
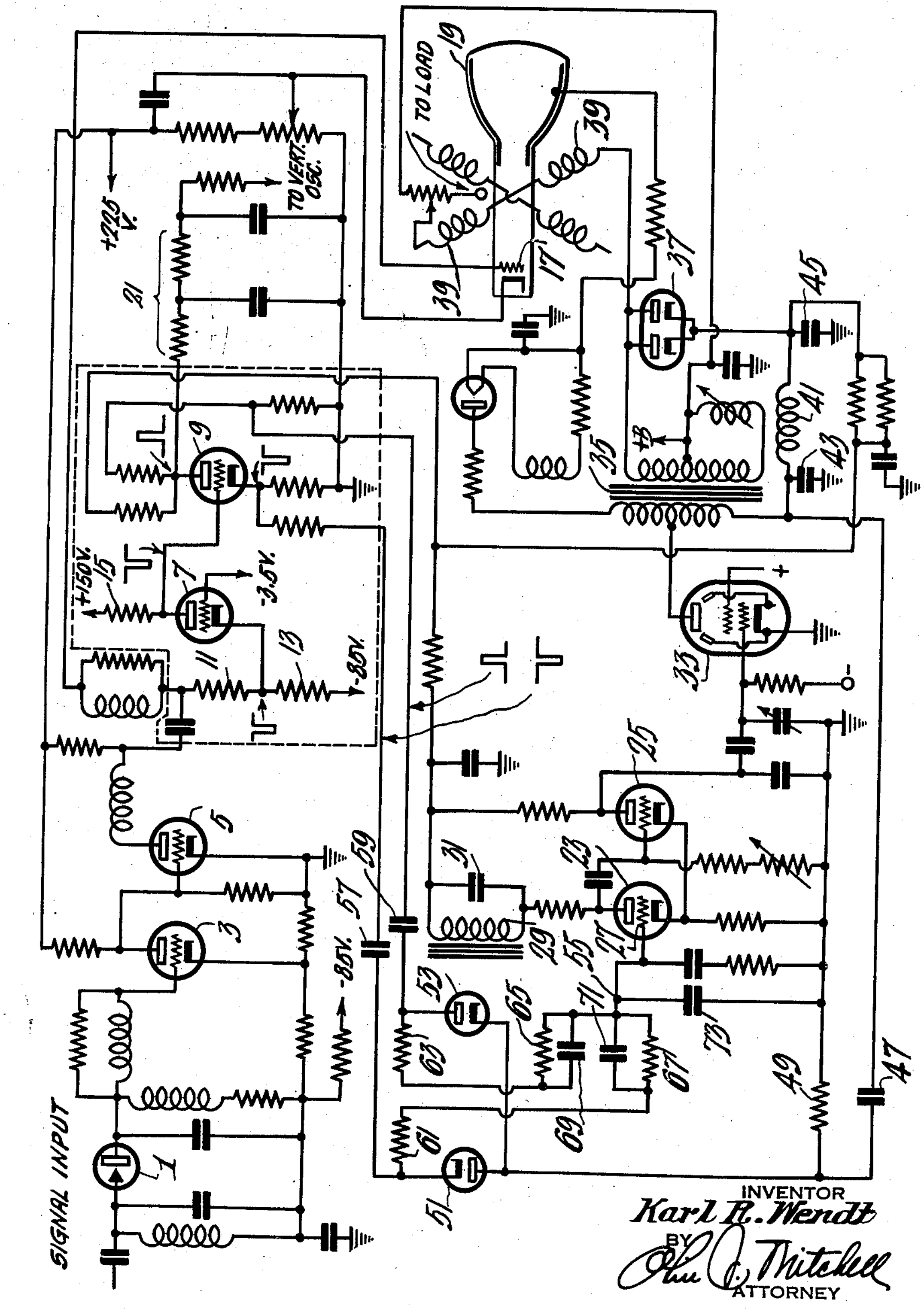
INVENTOR
Karl R. Wendt
BY
Paul J. Mitchell
ATTORNEY Patented July 29, 1952

2,605,350

UNITED STATES PATENT OFFICE 2,605,350

SYNCHRONIZING SIGNAL SEPARATOR CIRCUIT

Karl R. Wendt, Eggertsville, N. Y., assignor to Radio Corporation of America, a corporation of Delaware Application October 23, 1948, Serial No. 56,246

2 Claims. (Cl. 178—7.3)

This invention relates to the synchronization of scanning in television receivers and more particularly to circuit arrangements for separating the synchronizing pulses from the image signal component of a composite television signal.

It has been the usual practice to synchronize the cathode ray deflection or scanning at the receiver with the scanning at the transmitter by transmitting to the receiver a mixture of image signals and synchronizing pulses and by applying the received synchronizing pulses after separation from the image signals to an oscillator in the deflection circuit of the receiver.

The R. M. A. Standard T–111 television signal as defined by the R. M. A. Television Committee, involves the use of but one communication channel for all synchronizing functions. The upper section amounting to 20 to 25 percent of the total amplitude is devoted to synchronization and the remaining and lower section to the image signals.

The polarity of the current or voltage is purposely chosen so that as the amplitude of the video signal increases, the corresponding brilliance in the reproduced image decreases. This is called "negative transmission."

It will be seen therefore that white tones in the image are produced by low amplitude signals, successively deeper grays are represented by higher amplitude signals, while the so-called "black level" representing a total absence of light is still at a higher level. This black level has been fixed by standardization at a value of 75 to 80 percent of the maximum amplitude in the signal. During transmission this black level relative to the maximum level of the signal is maintained constant.

It will be understood that any portion of the video signal above the black level cannot produce light variations in the received image. This upper region is known as the "blacker than black" region.

The variations in voltage constituting the image intelligence are produced by the camera tube at the transmitting station as it scans the lines in the image. At the conclusion of each line the camera control electrode becomes negative with respect to the gun cathode to extinguish the electron beam while the scanning beam is retracing to the beginning of the next line. During this negative period a blanking amplifier imposes on the signal transmitting circuit, a voltage the amplitude of which corresponds to black. During the retrace interval therefore no image information is transmitted. In the receiver the scanning beam is retracing during this retrace interval and is maintained at the black level so that no luminescence is provided on the receiving image tube secreen.

Immediately after the beginning of the blanking period the signal amplitude is caused to rise momentarily still farther into the blacker than black region by an impulse superimposed on the signal circuit by the synchronizing signal generator at the transmitter. This impulse, the horizontal-synchronization impulse, controls the action of the horizontal scanning generator at the receiver.

At the completion of the scanning of each field another type of synchronizing pulse is inserted in the signal circuit to provide vertical synchronization of the scanning action.

In the receiving station it is, of course, necessary to separate the synchronizing impulses from the image information. This is accomplished in what is known as a synchronizing signal separator.

In the U. S. patent to R. L. Campbell No. 2,178,736, dated November 7, 1939, there is shown and described a synchronizing signal separator wherein the separation is accomplished by biasing a tube in such a manner that it "clips off" only that portion of the composite signal which is in the upper 20 or 25 percent of the maximum amplitude. The image signals whose amplitude never exceeds 70 or 75 percent of the maximum amplitude of the composite signal is therefore not passed through the separator. The Campbell patent referred to also includes circuit arrangements for separating the horizontal from the vertical synchronizing pulses.

Another circuit arrangement for the separation of synchronizing pulses together with a detailed analysis and discussion of the forms of synchronizing pulses is included in the U. S. patent to A. V. Bedford, No. 2,207,775, patented July 16, 1940.

It is to this general subject matter which the present invention is primarily directed.

In order to transmit accurately the intelligence information included in an image, the image signal must not only include at any instant an amplitude that corresponds to the relative brightness of the image element scanned at that instant, but it must include the average value that corresponds to the average illumination of the scene. This steady-state aspect of the image signal is usually referred to as the "D. C. component."

The D. C. component may be defined as the varying unidirectional portion of the complete video signal. This definition may be derived from the fact that the accepted standards state that the black level will be represented by a definite carrier level independent of light and shade in the picture.

Because all values of light must be represented by various signal levels extending in only one direction from zero, the image signal must possess a unidirectional or a D. C. component in order to properly represent various light shades of an image.

It is fundamental to the electrical art that signal transmitting circuits such as radio transmitting circuits involving transformers and condensers lose the direct current component of a transmitted signal. It then follows that in order to have accurate reproduction of images at the receiving stations, it is necessary to properly restore the direct current component of the image signal.

Not only is the proper D. C. restoration important for the reproduction of true light values in the reproduced image, it is also important for receiver synchronization since the failure of the D. C. restorer of the sync separator when noise is present on the signal constitutes the real and limiting weakness in receiver synchronization.

In accordance with this invention there is provided a circuit arrangement which accurately separates the synchronizing pulses from the accompanying image signal and provides for the proper restoration of the D. C. component. According to this invention there is provided an input tube, an output tube, and means for applying the video signal between the cathode of the input tube while a point of fixed potential and a direct current connection is provided between the anode of the input tube and the control electrode of the output tube.

A primary object of this invention is to provide for an improved television receiving system.

Another object of this invention is to provide for improved scanning synchronization in a television receiver.

Other and incidental objects of the invention will be apparent to those skilled in the art from a reading of the following specification and an inspection of the accompanying drawing which illustrates by circuit diagram one form of this invention.

Turning now in more detail to the drawing, there is shown in the upper left hand corner of the drawing the signal input circuit which is intended to receive a composite television signal including both the image component and the synchronizing pulses. Such a composite signal may, of course, be obtained by employing any of the well known television receiver circuits such as, for example, those shown and described in the article "Television receivers" published in RCA Review, March 1947, beginning on page 5.

The input signal including both the image signal and synchronizing pulses are applied to the detector 1, which, for the purpose of illustration, is indicated as a rectifier. A direct current coupling is provided to its associated video amplifier involving tubes 3 and 5.

Detector circuits as well as video amplifiers are also well known to the art and it is not intended here to set out in detail circuit components or theory of operation of detector circuits or video amplifiers. It is believed sufficient here to note that the composite signals including the image and synchronizing components are applied to the synchronizing signal separator, and D. C. restorer including tubes 7 and 9.

As has already been noted the synchronizing pulse separator is necessary to separate the synchronizing pulses from the image signal of the composite television signal. Because of the fact that the synchronizing pulses are included only in that amplitude range of the signal above 70 to 75 percent of the maximum amplitude the synchronizing pulses may be isolated by amplitude separation.

The composite signal is applied to the cathode of tube 7 through a resistance element 11. The control electrode of tube 7 is negatively biased at, for example, −3.5 volts as illustrated. A negative bias potential terminal of, for example, −85 volts is connected to the cathode of tube 7 through a resistance 13.

A tube with proper characteristic and appropriate bias potentials is employed so that any signal amplitude less than the "black level" or approximately 70 to 75 percent of maximum composite signal amplitude will vary the potential of the cathode tube 7 within a range of potentials sufficiently positive that the bias between the control electrode and cathode of tube 7 is sufficient to cut off completely the anode current of tube 7. It will be noticed that the signal is so polarized when applied to the cathode of tube 7 that the synchronizing pulses are in a negative direction.

When, however, the synchronizing pulse arrives at the cathode of tube 7, it will cause the cathode of tube 7 to be driven in a negative potential direction. This will cause tube 7 to draw anode current and pass the synchronizing pulse to its outpt circuit.

The anode of tube 7 is supplied with an anode potential through a resistance 15 which is relatively high and may, for example, be of the magnitude of 1.5 megohms.

An anode resistor of 1.5 megohms for a television circuit would normally be considered entirely too high a value across which synchronizing pulses may successfully be generated. This is, of course, because tube and circuit capacities would normaly cause a severe integration of the high frequency components included in a synchronizing pulse.

However, in accordance with this invention the negative going edges of the synchronizing pulses are controlled by the plate impedance of tube 7 which is sufficiently low that the high frequency components of the synchronizing pulse will not be severely integrated.

The positive going edges of the pulses would normally be severely integrated but in accordance with this invention the charge of the distributed capacity of tube 7 and its associated circuit components is toward 150 volts which is the applied anode potential. Therefore the initial portion of the charging action will be a steep slope and correspond to the original pulse front.

After the anode potential of tube 7 rises at the end of a synchronizing pulse to a small portion of the anode potential of 150 volts, the second tube 9 commences drawing grid current which stops further swing in a positive direction and loads the output circuit of the tube 7. This effectively reduces the load impedance of tube 7 to prevent integration. In addition high frequencies cannot be easily coupled through the capacity of tube 7.

The control electrode of tube 7 is connected to a negative bias as indicated to insure also that grid to cathode bias on tube 7 will result in an anode voltage for tube 7 which is more positive than the cut-off voltage of tube 9. The steady state current conduction through tube 7 provides a voltage drop across resistor 13 to provide the proper grid to cathode bias on tube 7.

The direct current connection between the anode of tube 7 and the control electrode of tube 9 further insures that the clipping levels will be maintained constant regardless of synchronizing pulse widths, heights, or noise pulse durations.

In connection with the clipping action of tubes 7 and 9 the cathode resistor 13 of tube 7 is larger than for normal circuits of this arrangement. This improves the D. C. setter action.

The D. C. restoration for the synchronizing separator also supplies the D. C. component for the control electrode 17 of kinescope 19.

The composite signal received from tube 5 is not only applied to the cathode of tube 7 but is applied to the control electrode 17 of kinescope 19. The vertical synchronizing pulses are separated in circuit 21 in accordance with well known procedure to be applied to the vertical synchronizing signal oscillator not shown. In the explanation of the operation of this invention reference will be directed primarily to the horizontal deflection portion of the scanning.

The horizontal oscillator selected for the purpose of explanation of the operation of this invention, is of the multivibrator type involving tubes 23 and 25. Although any suitable oscillator circuit may be employed, the particular form involving tubes 23 and 25 and shown in detail in the drawing is arranged to oscillate at a frequency dependent not only upon circuit constants but upon the bias potential applied to the control electrode 27 of tube 23.

Basically the multivibrator circuit involving tubes 23 and 25 is a two-stage resistance-coupled amplifier in which the output of the second tube 25 supplies the input of the first tube 17 with feedback energy to cause oscillation. An inductance 29 and condenser 31 are provided in the anode circuit of tube 23. A more detailed explanation of the operation of multivibrator circuits may be found in any of the radio textbooks such as, for example, the Radio Engineering Handbook by F. E. Terman, first edition.

The output signal of the oscillator involving tubes 23 and 25 is supplied to the control electrode of the deflection power output tube 33.

The power output tube 33 produces in a transformer 35 a current which in combination with the dual diode tube 37 known as the damper tube produces a constant voltage across horizontal deflection coils 39 to produce in turn the linear deflection required for kinescope 19.

Generally the deflection circuits of the type shown and employing the so-called damper tube 37 cause a current to flow through the damper tube 37 during the scansion as a result of the energy stored in the circuit inductance during the retrace periods of the cathode ray scanning cycle. This current theoretically may be combined with the current output of the power tube to a summation characteristic which is linear with respect to time.

It has been found that the non-linearity of scanning is due to a dropping off of deflection coil current and the voltage may be compensated by controlling the flow of current through the damper tube 37 and that as a result of such control, the voltage across the beam deflection coils 39 during the scansion may be maintained relatively constant. A preferred arrangement for accomplishing this linearity control is shown in the drawing and includes an inductance 41 and condensers 43 and 45. The operation of the circuit involving inductance 41 and condensers 43 and 45 with respect to its control of linearity, is discussed at some length in the U. S. Patent to S. I. Tourshou, No. 2,440,418, dated April 27, 1948.

As a result of the current drawn by tube 33 in its anode circuit through the primary of transformer 35 there is a recurrent parabola voltage wave occurring across condenser 43.

According to my U. S. Patent No. 2,564,588 entitled "Phase Comparator for Horizontal Sweep Deflection Circuit" dated August 14, 1951, this recurring parabola voltage wave is utilized in an automatic frequency control circuit. This voltage is such that it may be severely differentiated in the circuit involving condenser 47 and resistor 49 to form a sawtooth voltage.

This sawtooth voltage obtained from the differentiator involving condenser 47 and resistor 49 is applied to a clamp circuit involving diode 51 and diode 53.

Although one form of clamping circuit is illustrated any suitable arrangement may be employed to establish proper bias level at point 55 which is dependent upon the relative phase of the sawtooth wave and the incoming synchronizing pulses.

Various clamp circuits are shown and described in detail in the published art such as, for example, in my paper entitled "Television D. C. component" published in the RCA Review for March, 1948.

A clamping circuit of the type illustrated in the drawing as applied to direct current reinsertion in television systems is shown and described in my U. S. Patent No. 2,299,945, dated October 27, 1942.

The clamp circuit shown consists of the two diodes 51 and 53 driven by push-pull pulses from the anode and cathode circuit of tube 9.

The two diodes 51 and 53 are driven through two condensers 57 and 59 and are connected by two resistors 61 and 63 through appropriate filter circuits involving resistors 65 and 67 and condensers 69 and 71. The time constant of the condenser 57 and resistor 61 circuit as well as the time constant of condenser 59 and resistor 63 circuit is long compared to the pulse time.

The exact voltage to which condenser 73 is charged or to which point 55 is brought during the pulse time depends upon the voltage across resistor 49 at pulse time. This will be understood when it is appreciated that the diodes 51 and 53 are biased such that their cathodes are positive with respect to their associated anodes during all the time except during a synchronizing pulse when the cathode of diode 51 is driven in a negative direction to the potential of the anode of diode 51 and the anode of diode 53 is driven positive to the potential of its associated cathode. It therefore follows that the potential at point 55 is dependent upon the relative phase of the sawtooth voltage across resistor 49 and the incoming synchronizing pulses. The frequency of the multivibrator involving tubes 23 and 25 is thereby controlled in accordance with the relative phase of the generated sawtooth voltage with respect to the applied synchronizing pulses. If, for example, the speed of the oscillator involving tubes 23 and 25 increases, the relative phase between the sawtooth voltage and the synchronizing pulses will change to cause the oscillator to slow down in frequency.

Although certain operating voltages and resistance values have been suggested, it is intended that they be merely illustrative. Any suitable values as well as tube types and circuit arrangements may be employed without departing from the spirit of this invention.

Although a push-pull output circuit for tube 9 is provided it is of course possible that a single sided output signal may be obtained by the practice of this invention.

Having thus described the invention what is claimed is:

1. In a television system of the type employing a composite video signal including image signals and synchronizing pulses, said synchronizing pulses recurring at periodic intervals in time, said image signals interspersed with said synchronizing pulses, said television system having a ground reference potential, a source of fixed negative potential with respect to said ground reference potential, a source of anode potential, and a source of control electrode potential, a synchronizing pulse separator comprising, in combination, an input tube and an output tube each having a cathode, control electrode, and anode, a load resistance connected between said input tube anode and said source of anode potential, a cathode resistance connected between said input tube cathode and said source of fixed negative potential, said input tube control electrode adapted to be connected to said source of control electrode potential, a low resistance direct current path between said input tube anode and said output tube control electrode, an output tube cathode resistance, said cathode of said output tube connected to one end of said output tube cathode resistance, the other end of said output tube cathode resistance adapted to be connected to said ground reference potential, means for applying said video signal between the cathode of said input tube and said source of fixed negative potential with the synchronizing pulses extending in a negative direction, and means establishing said source of anode potential and said load resistance such that the control electrode of said output tube normally draws current during the period of time between successive synchronizing pulses.

2. In a television system of the type employing a video signal including image signals and synchronizing pulses, said synchronizing pulses occurring periodically in time, and said image signals occurring between said synchronizing pulses, a synchronizing pulse separator including the combination of an input and output tube each having a cathode, a control electrode, and an anode, a load resistance, said anode of said input tube connected to one end of said load resistance, said anode of said input tube also directly connected to said control electrode of said output tube, a resistance having two outside terminals and an intermediate terminal, a source of negative bias potential, a source of control electrode potential, one of the outside terminals of said resistance connected to said source of negative bias potential, a connection between the cathode of said input tube and the intermediate terminal of said resistance, said control electrode of said input tube connected to said source of control electrode potential, means for applying said video signal to the other outside terminal of said resistance in such a manner that the synronizing pulses momentarily decrease the potential at the anode of the input tube, and means establishing the anode of said input tube at a potential positive with respect to the potential of said cathode of said output tube, whereby said control electrode of said output tube draws current during the period of time between successive synchronizing pulses.

KARL R. WENDT.

REFERENCES CITED

The following references are of record in the file of this patent:

UNITED STATES PATENTS

| Number | Name | Date |
|---|---|---|
| 2,095,261 | McCaa | Oct. 12, 1937 |
| 2,226,994 | Schlesinger | Dec. 31, 1940 |
| 2,227,002 | Schlesinger | Dec. 31, 1940 |
| 2,245,409 | Miller | June 10, 1941 |
| 2,344,810 | Fredendall et al. | Mar. 21, 1944 |